Nov. 17, 1964 C. J. BARBAGALLO 3,157,858
ELECTRICAL STORAGE APPARATUS
Filed Nov. 30, 1961
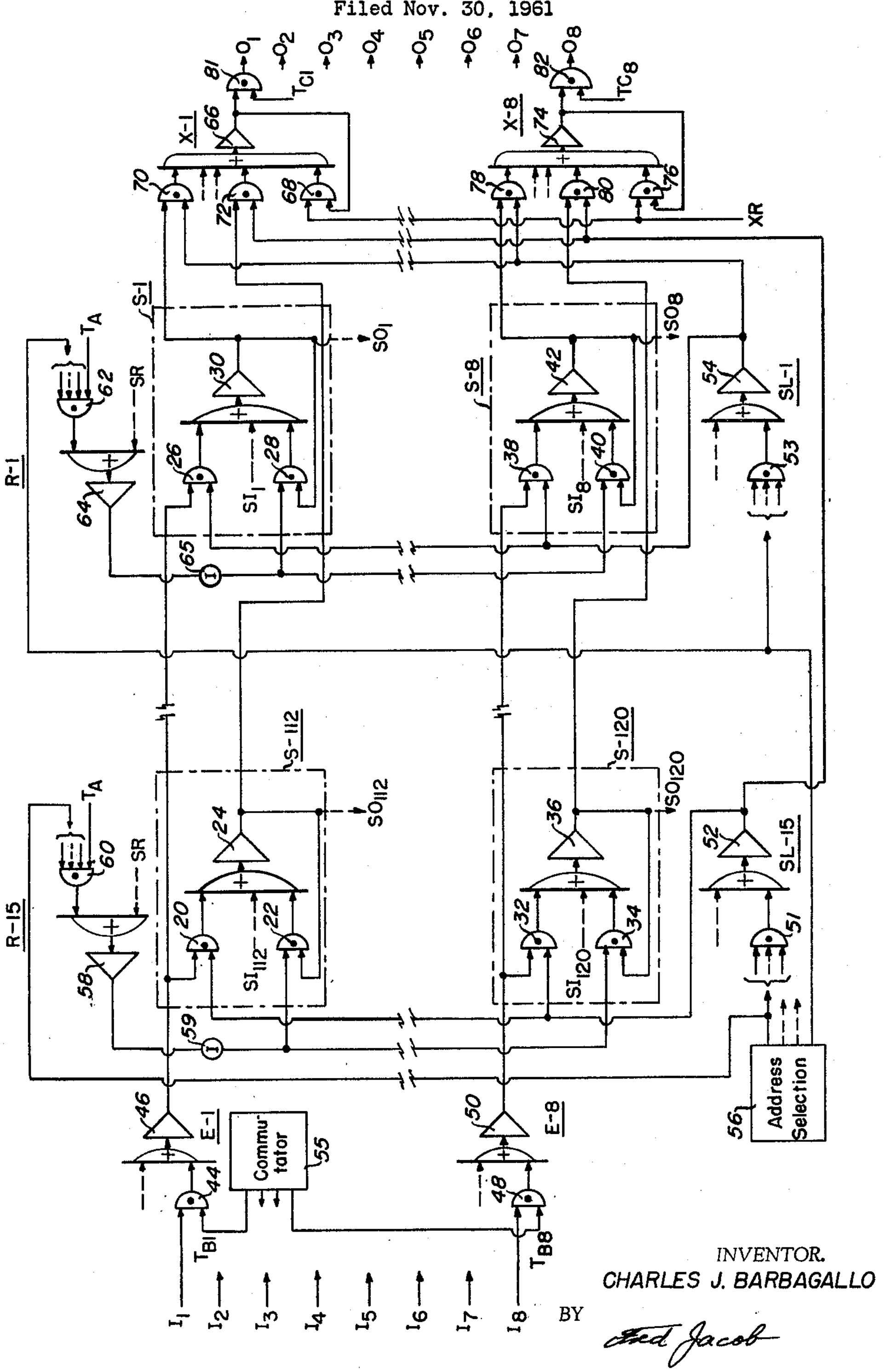
INVENTOR.
CHARLES J. BARBAGALLO
BY Fred Jacob
ATTORNEY United States Patent Office 3,157,858

Patented Nov. 17, 1964

3,157,858

ELECTRICAL STORAGE APPARATUS

Charles J. Barbagallo, Needham, Mass., assignor to Honeywell Inc., a corporation of Delaware Filed Nov. 30, 1961, Ser. No. 156,017
7 Claims. (Cl. 340—173)

The present invention relates in general to a data storage device, and in particular to a high-speed digital data storage device having a plurality of discrete storage units capable of being selectively addressed.

Where data is transferred from one domain to another and the operating conditions in the respective domains are not the same, a buffer storage facility between the respective domains is usually required in order to permit the receiving domain to accept the incoming information in the manner dictated by its own operation. Such a requirement arises in large computer systems where the central processor which carries out the actual calculations frequently operates at a speed in excess of that of the peripheral output equipment which transfers the processed data to a permanent storage medium. Systems such as the one described, often employ a coincident current core matrix to carry out the buffer storage function. The salient advantages of a core matrix are simplicity of construction and economy. In addition, the various storage locations of a core matrix are randomly addressable by the selection of a pair of row and column lines and the data may be stored indefinitely in the cores.

The disadvantage of a coincident current core matrix resides in its relatively slow operation which imposes a limitation upon the speed at which data can be transferred. While the operation of a peripheral output device is generally slower than that of the computer system's central processor, the latter may be connected to supply a number of peripheral devices in sequence with processed output data. In such a case, any limitation on the speed of data transfer which is caused by the buffer may result in a slowdown of the over-all system. Similarly, any buffer-incurred limitation on the speed of data transfer to the central processor from a peripheral input device, e.g., from a card reader, is undesirable. A further disadvantage of a coincident current core matrix is the absence of signal amplification which limits its ability to drive subsequently connected circuitry. If additional amplifiers are required, the advantages of low cost and simplicity of construction are compromised.

Where the foregoing disadvantages have dictated a different approach, high-speed shift register arrays have generally been employed. The time required to address a single location of such an array may be of the order of one-half microsecond or less as compared to a six-microsecond addressing time in a core matrix. A single shift register stage most commonly consists of a pair of flip-flop circuits or, alternatively, of one flip-flop circuit and a pair of delay lines. Inasmuch as a flip-flop circuit requires at least two transistors or two tubes, the cost of such an array to carry out a buffering function is relatively high. Also, this type of array is sufficiently complex is construction to require a relatively large amount of servicing time in order to maintain it in reliable operating condition. The ordinary serial shift register array, moreover, is not as flexible as a core matrix. Special parallel readin and readout connections are required to address a selected location, thereby further adding to the complexity of the circuit.

Accordingly, it is a primary object of the present invention to provide high-speed data storage means which avoid the foregoing disadvantages.

It is another object of this invention to provide high-speed digital data storage means having a plurality of selectively addressable storage units.

It is another object of this invention to provide apparatus for digital data buffer storage which is capable of high operating speeds and which is simple and economical in construction.

These and other novel features of the invention, together with further objects and advantages thereof will become apparent from the following detailed specification with reference to the single figure of the accompanying drawing which illustrates a preferred embodiment of the invention.

With reference now to the drawing, the invention is seen to include a plurality of separate storage units which, in the illustrated embodiment, are organized in array fashion into eight rows and fifteen columns so as to constitute 120 units S–1 to S–120. For the sake of clarity, only the storage units S–1, S–8, S–112 and S–120 have been illustrated to define the extent of the array by means of rows 1 and 8 as well as columns 1 and 15.

Each storage unit comprises at least one data input gate and a recirculation gate, both buffered to an amplifier whose output is connected back to an input leg of the recirculation gate. Further inputs for special-purpose operations may be buffered to the amplifier in each storage unit, as indicated schematically by the broken-line arrows such as $SI_1$, $SI_8$, $SI_{112}$ and $SI_{120}$. In the storage unit S–1 which is defined by the first column and the first row of the array, the gates 26 and 28 and the special input $SI_1$ are buffered to the amplifier 30. The output of the amplifier 30 is connected to the input of the recirculation gate 28, as well as to a special output $SO_1$. In the storage unit S–8 which is defined by the first column and the eighth row of the array, the gates 38 and 40 and the special input $SI_8$ are buffered to the amplifier 42. The output of the latter is connected to one input leg of the recirculation gate 40 and the special output $SO_8$. In the storage unit S–112 whose location is defined by the fifteenth column and the first row, a pair of gates 20 and 22 and $SI_{112}$ are buffered to an amplifier 24, which is further connected to one input of the recirculation gate 22 and to $SO_{112}$. In the storage unit S–120, which is addressed as the fifteenth column and the eighth row, the gates 32 and 34 and $SI_{120}$ are buffered to an amplifier 36 whose output is connected to the recirculation gate 34 and to the special output $SO_{120}$. Corresponding connections exist in the remaining storage units of the array.

In the preferred data organization, the information arrives on eight channels $I_1$ to $I_8$. Eight substantially identical information entry units E–1 to E–8 are provided such that a separate entry unit corresponds to each row of the array. For the sake of clarity, only $E_1$ and $E_8$ have been illustrated. The entry information unit E–1 comprises at least one gate 44 which is buffered to the input of an amplifier 46. As shown by the broken-line arrow, additional inputs may be buffered to the amplifier 46 for special data entry situations which are beyond the scope of this discussion.

The incoming information from channel $I_1$ is applied to one input of the gate 44, the other gate leg receiving a timing function $T_{B1}$ which is derived from a commutator 55. The output of the amplifier 46 is coupled to each of the storage units of the first array row, as illustrated by its connection to one input leg each of the gates 20 and 26. The entry unit E–8 is seen to comprise at least one gate 48 which receives the input information from the channel $I_8$ on one of its gate legs. The other gate leg receives a timing function $T_{B8}$ from the commutator 55. The gate 48 is buffered to an amplifier 50 which is coupled to each storage unit of the eighth array row, as illustrated by its connection to the amplifiers 32 to 38. Each of the remaining input channels is similarly connected to one of the entry units E–2 to E–7 which are not illustrated.

Each of the fifteen columns of the illustrated array has a selection unit associated therewith, as illustrated schematically in the drawing by the first and last selection units SL–1 and SL–15 respectively, the intermediate selection units SL–2 to SL–14, which are substantially identical, having been omitted. Each selection unit includes an amplifier which has at least one gate buffered to its input. As shown, the gate 51 of the selection unit SL–15 is buffered to the amplifier 52 which may receive an additional special-purpose input as indicated by the broken-line arrow. Similarly, the gate 53 is buffered to the amplifier 54 in SL–1 together with a special-purpose input. The input of each selection unit gate is connected to an output of an address selection unit 56, which may include a counter. Each output of the unit 56 may consist of a plurality of channels so as to provide suitable actuating signals at the appropriate gate inputs each time the counter runs through a sequence of addresses.

The output of the selection amplifier 52 is coupled to each of the storage units in column 15, such as the storage units S–112 to S–120. This is schematically indicated in the drawing by its connection to one leg of the gate 20 in the storage unit S–112 and to a corresponding leg of the gate 32 in the storage unit S–120. Similarly, the output of the selection amplifier 54 is coupled to each of the storage units S–1 to S–8 in the first column of the array, as illustrated by its connection to one leg of the gate 26 in the storage unit S–1 and to one leg of the gate 38 in the storage unit S–8.

Fifteen substantially identical reset units R–1 to R–15 are connected so that one reset unit is associated with each column of the array. R–1 and R–15 only are illustrated in the drawing. The unit R–15 comprises an amplifier 58 which has a gate 60 buffered to its input. As indicated by the broken-line input labelled SR, a special resetting signal may also be buffered to the amplifier if desired. The address selection data which is applied to the gate 51, is further coupled to the input of the gate 60 together with a timing function $T_A$. The output signal of the amplifier 58 is inverted by the inverter 59 and is thus applied to corresponding inputs of all the recirculation gates in column 15, such as the gates 22 and 34 in the storage units S–112 and S–120 respectively. Similarly, the output derived from the address selection unit 56 which is applied to the gate 53 of the selection unit SL–1 is further coupled to a gate 62 of the reset unit R–1. Gate 62 additionally receives the aforesaid timing function $T_A$ at its input, its output being buffered to a reset amplifier 64 together with the above-mentioned special-purpose reset input SR. The output of the amplifier 64 is coupled to an inverter 65 and thence to the recirculation gate of each storage unit of column 1, such as the gate 28 of the storage unit S–1 and the gate 40 of the storage unit S–8.

Eight substantially identical exit units X–1 to X–8 are so arranged that one unit is associated with each row. Each exit unit comprises a gate buffer amplifier which is capable of storing data by recirculation. Only the units X–1 and X–8 are illustrated. The unit X–1 comprises an amplifier 66 whose output is coupled to one input of a recirculation gate 68. A separate gate is connected to the output of each of the fifteen storage units in the first row of the array. The output of each of these fifteen gates, together with the output of the recirculation gate 68, is buffered to the amplifier 66. In the drawing, only the gates 70 and 72, respectively associated with the illustrated storage units S–1 and S–112 of the first array row, are illustrated. As shown, the gate 70 has one of its input legs connected to the output of the amplifier 30 in S–1 and the gate 72 has an input leg connected to the output of the amplifier 24 in S–112. The remaining gates of the unit X–1 are schematically indicated by the broken-line arrows. Another input leg of the gate 70 is connected to the amplifier 54 in the selection unit SL–1. A corresponding input leg of the gate 72 is connected to the output of the amplifier 52 in the selection unit SL–15. It will be noted that the output of any given selection unit is connected both to a particular gate of the exit unit X–1 as well as to the storage unit whose output is coupled to the same gate. This similarly holds true for those gates of the exit unit X–1 which are not illustrated.

The exit unit X–8 comprises an amplifier 74 whose output is coupled to one input of a recirculation gate 76. A separate gate is connected to the output of each of the fifteen storage units in the eighth row of the array. These gates, together with the gate 76, are buffered to the input of the amplifier 74. As in the case of the exit unit X–1, only a pair of gates 78 and 80 are shown in the drawing, intermediate gate outputs being schematically indicated by broken-line arrows. Of the illustrated gates, the gate 78 receives an input from the amplifier 42 in the storage unit S–8. The other input leg of the gate 78 is connected to the amplifier 54 in the selection unit SL–1 which is coupled to the first column of storage units of which S–8 is a part. Similarly, one input of the gate 80 is connected to the output of the amplifier 36 in the storage unit S–120 of the fifteenth array column, the other gate input being connected to the output of the amplifier 52 belonging to the selection unit SL–15 which is coupled to each storage unit of the same column.

Each exit unit is coupled to a corresponding output gate, the latter further receiving timing signals $T_{C1}$ to $T_{C8}$. The gates 81 and 82 are illustrated as being connected to the exit units X–1 and X–8 and are seen to receive timing signals $T_{C1}$ and $T_{C8}$ respectively. Output signals are derived from each of the aforementioned gates to provide an output on eight channels $O_1$ to $O_8$.

In operation, a frame of data in the form of digitally encoded information representative of binary ONE's and ZERO's arrives on eight input channels $I_1$ to $I_8$. This data is applied to the input gates of all the entry units, such as the gates 44 and 48 of the units $E_1$ and $E_8$ respectively. For reasons explained hereinbelow, the commutator 55 provides eight timing pulses $T_{B1}$ to $T_{B8}$ in sequence so as to enable the input gates of the entry units sequentially.

Let it be assumed that the data frame arriving by way of the channels $I_1$ to $I_8$ is to be stored in column 1 of the array, i.e., in the storage units S–1 to S–8, which have been previously cleared in order to accept the incoming data. The appropriate output signal of the address selection unit 56 is accordingly coupled to the gate 53 of the selection unit SL–1. The resultant pulse at the output of the amplifier 54 enables one gate in each of the storage units S–1 to S–8, such as the gates 26 and 38 in S–1 and S–8 respectively.

When the timing signal $T_{B1}$ occurs, the input data in channel $I_1$ is gated to the amplifier 46 by means of the gate 44. The output signal of the amplifier 46 is gated to the amplifier 30 of S–1 by means of the gate 26. The information in channels $I_2$ to $I_8$ is similarly transferred to the corresponding storage units of column 1. The data readin operation for column 1 of the array is completed upon the occurrence of the timing signal $T_{B8}$ which transfers the data in the input channel $I_8$ to the amplifier 42 of S–8 by way of the gate 8, amplifier 50 and gate 38.

The address selection unit 56 further addresses the reset unit associated with the array column that is being addressed. In the present example, a signal is applied to the input of the gate 62 of the reset unit R–1, i.e., binary ONE's are applied to the connected gate legs. In the absence of a timing signal $T_A$, the gate 62 remains cut off. The resultant binary ZERO which appears at the output of the amplifier 64 is inverted by the inverter 65 so that a binary ONE is applied to enable all the recirculation gates of the storage units of column 1, such as the gates 28 and 40 in S–1 and S–8 respectively. Accordingly, the data transferred to the amplifiers of these storage units, e.g., to the amplifiers 30 and 42 in S–1 and S–8 respectively, is recirculated by way of the gates 28 and 40 respectively. In this manner a data frame is stored dynamically in the storage units of column 1 of the array. Subsequently arriving data frames from the input channels $I_1$ to $I_8$ may be stored in the remaining array columns until the entire array is filled.

Assuming that the output device which is coupled to the output channels $O_1$ to $O_8$ is ready to receive the data frame stored in column 1 of the array, the stored frame is first transferred to the exit units X–1 to X–8. The output signal of the selection unit SL–1 is applied to one gate in each of the exit units X–1 to X–8 which are connected to receive input data from the storage units of the first array column. Thus, when the gate 70 is enabled by the application of a signal from the selection unit SL–1, it becomes conductive so as to transfer the data which is stored in S–1 to the amplifier 66. Similarly, the data stored in S–8 is transferred to the amplifier 74 of the exit unit S–8 by way of the gate 78 which is enabled by a signal from SL–1. Similar operations occur with respect to all other exit units which thus receive the data stored in the corresponding storage units of column 1.

As long as an appropriate signal XR is applied to maintain the recirculation gate of each exit unit conductive, the data received by each exit unit is stored dynamically by recirculation. In the case of the unit X–1, the recirculation gate 68 is enabled by XR and couples the output signal of the amplifier 66 back to the input of the latter. In the unit X–8, the gate 76 is maintained conductive and recirculates the output of the amplifier 74 back to the input of the latter. As a result of this action, the data frame stored in the first array column, is now additionally stored in the exit units X–1 to X–8.

As previously explained, the gate 62 of the resetting unit R–1 which receives the same address selection signals from the unit 56 as does SL–1, remains cut off in the absence of a timing signal $T_A$. As long as the input signal derived from the amplifier 64 of the resetting unit R–1 remains ZERO, the inverted output signal of the inverter 65 will maintain the recirculation gates of the storage units S–1 to S–8 conductive and the stored data, which was not destroyed upon readout to the exit units, will continue to recirculate. Upon the occurrence of the timing signal $T_A$ after the data readout from the storage unit S–1 to S–8 has been completed, the inverted output signal of amplifier 64 disables the recirculation gates of these storage units and they are reset to ZERO. The storage units S–1 to S–8 have now been cleared of the previously stored data and they are ready to receive a new data frame.

The commutator 55, by providing the signals $T_{B1}$ to $T_{B8}$ in sequence, serves to transfer the data from the channels $I_1$ to $I_8$ sequentially to the storage units S–1 to S–8. While this commutating operation is not required to transfer a frame of data to the storage array, it is readily adaptable to provide selectivity so that information may be transferred to a chosen storage unit. For example, if it were desired to transfer data to S–1 only, the timing signals $T_{B2}$ to $T_{B8}$ could be made ZERO. This action would prevent the input gates of the entry units $E_2$ to $E_8$ from becoming conductive and the gate 44 alone would be enabled.

With the arrangement shown, an entire data frame must be transferred to the exit units X–1 to X–8 simultaneously. The application of the timing signals $T_{C1}$ to $T_{C8}$ in sequence to the output gates, such as the gate 81 and the gate 82, will however cause the output signals to be applied in sequence to the output channels $O_1$ to $O_8$. It will be understood that the exit units must be cleared before receiving the next data frame. This is done by disabling their recirculation gates, such as the gate 68 in X–1 or the gate 76 in X–8, by means of the exit unit resetting signal XR. The timing signals $T_{C1}$ to $T_{C8}$ may be derived from the commutator 55 which provides the timing signals $T_{B1}$ to $T_{B8}$. Inasmuch as $T_{C1}$ to $T_{C8}$ must precede the clearing of the exit units, these timing signals will also precede $T_{B1}$ to $T_{B8}$.

It is possible to read out a single storage unit by first transferring the contents of all the storage units of the array column to the associated exit units and then reading out the exit unit which contains the desired data selectively by means of the timing signal $T_C$. Thus, if $T_{C2}$ to $T_{C8}$ were made 0, only the information in the exit unit X–1 will become available as an output signal in the output channel $O_1$. Since the readout from the exit units is a nondestructive operation, the selective readout of X–1, as explained above, will not destroy the contents of any storage unit in the first array column.

It will be noted that as far as the entry and exit units respectively are concerned, the invention may also simulate the operation of a conventional register. This is accomplished by sequencing the times when the selection units SL–1 to SL–15 are active, as determined by the address selection unit 56. Under these conditions, the first incoming frame of data in the channels $I_1$ to $I_8$ is dropped into the first array column made up of the storage units S–1 to S–8, subsequent to the readout and resetting of the latter. The next data frame is transferred to the second array column and so on until the fifteenth array column is reached. Prior to the transfer of a data frame to each column in sequence, the column is read out. The information at the exit units X–1 to X–8 is therefore received serially in shift register fashion. Similarly, as far as the entry units E–1 to E–8 are concerned, information is serially transferred into the array in the manner of a shift register. If desired under these operating conditions, a single timing pulse $T_B$ may be employed for reading each data frame into the array in synchronism. $T_C$ may also be a single pulse for simultaneous frame readout.

Each storage unit is seen to have a special input labelled SI with an appropriate subscript. These inputs are used when it is desired to drop 120 binary digits simultaneously into the storage array. Prior to such data readin however, the respective storage units must be cleared. This may be carried out simultaneously for all storage units by applying an appropriate signal to the special reset input SR in each of the resetting units R–1 to R–15. The application of this signal will disable the recirculation gate in each storage and will reset the latter to ZERO. Thereafter, the data readin may be effected. It is also possible to have simultaneous readout of the entire storage array by reading out the storage units directly at the special outputs labelled SO. Like the data readout on a frame-by-frame basis, the simultaneous readout is a nondestructive operation and the storage units must be reset prior to the arrival of new data.

The operation of the address selection unit 56 may be selectively controlled so that it is possible to address a chosen location as long as it is desired. This is of importance when, for example, the input source fails to provide the input data simultaneously on all input channels and it is necessary to read in the information bits into the respective storage units of an array column one at a time. In such a case, the address selection unit 56 must address the selection unit associated with the particular array column for the entire period required to receive the data in all the channels.

The adaptability of the invention to different situations enables it to operate not only in the manner of a conventional storage matrix, but also in the manner of a conventional serial shift register. In addition, parallel readin and readout means are provided so that a simultaneous data transfer to or from all the storage units in the array is possible. It will be understood that data readin and readout need not occur in the same manner. Data arriving one bit at a time or on a frame-by-frame basis, may be read out simultaneously. Similarly, once the data is stored, it may be read out in any desired way, regardless of the manner in which it arrived. Accordingly, the invention may be put to multi-purpose use without the necessity of circuit modifications. The advantages of a shift register and of a coincident current matrix are combined in the invention without the disadvantages of either circuit. While the individual storage units remain simple in construction and relatively inexpensive as in a matrix, the attainable speed of operation is comparable to that of a shift register. Moreover, the over-all circuit is relatively simple in construction and hence economical by virtue of its repetitive use of the same gate buffer amplifier as a building block.

From the foregoing disclosure of the invention, it will be apparent that numerous modifications, changes and equivalents will now occur to those skilled in the art, all of which fall within the true spirit and scope contemplated by the invention.

What is claimed is:

1. A data storage device comprising a plurality of storage units each including a gate buffer amplifier adapted to store a single binary digit by recirculation, said storage units being organized in a matrix configuration having at least columns and rows, means for providing input data from a plurality of channels each corresponding to one of said rows, gating means for simultaneously presenting the data in each channel to each storage unit of the corresponding row, strobing means for activating said last-recited gating means in sequence for the respective matrix rows, means for deriving address selection signals, gating selection means responsive to said last-recited signals for enabling the storage units of a chosen matrix column to receive the applied input data, an exit unit corresponding to each of said rows, each of said exit units comprising a gate buffer amplifier including a separate gate coupled to each storage unit of its corresponding row, means responsive to said address selection signals for simultaneously energizing appropriate ones of said last-recited gates to transfer the data frame stored in said selected column to said exit units, and gating means responsive to said strobing means for sequentially reading data out of respective ones of said exit units.

2. The apparatus of claim 1 and further comprising means for individually transferring data into a selected storage unit of said matrix, means for individually transferring data out of a selected storage unit of said matrx, and means for simultaneously activating said data transfer means for all the storage units of said matrix.

3. A data storage device comprising a plurality of storage units each including a gate buffer amplifier adapted to store a single binary digit by recirculation, said storage units being organized in a matrix configuration having at least columns and rows, means for providing a frame of input data in a plurality of channels each corresponding to one of said rows, means for applying the data in each channel simultaneously to all the storage units of the corresponding row, means responsive to externally derived address selection signals for simultaneously enabling the storage units of a selected column to accept said data frame, an exit unit corresponding to each of said rows, each of said exit units comprising a gate buffer amplifier including a separate gate coupled to each storage unit of its corresponding row, and means responsive to said address selection signals for simultaneously energizing appropriate ones of said last-recited gates to transfer the data frame stored in said selected column to said exit units.

4. A data storage device comprising a plurality of storage units each including a gate buffer amplifier adapted to store a single binary digit by recirculation, said storage units being organized in a matrix configuration having at least columns and rows, means for sequentially applying the respective digits constituting a frame of input data to a plurality of channels each corresponding to one of said rows, means for applying the data in each channel simultaneously to all the storage units of the corresponding row, means responsive to externally derived address selection signals for simultaneously enabling the storage units of a selected column to accept said data frame, an exit unit corresponding to each of said rows, each of said exit units comprising a gate buffer amplifier including a separate gate coupled to each storage unit of its corresponding row, means responsive to said address selection signals for simultaneously energizing appropriate ones of said last-recited gates to transfer the data frame stored in said selected column to said exit units, and means responsive to said address selection data for simultaneously resetting the storage units of said selected column.

5. A data storage device comprising a plurality of storage units organized into columns and rows, each of said storage units comprising a gate buffer amplifier adapted to store data by recirculation, a data entry unit corresponding to each of said rows, each data entry unit comprising a gate buffer amplifier adapted to apply timed input data to each storage unit of the associated row, a selection unit and a reset unit corresponding to each of said columns each comprising a gate buffer amplifier, each of said selection units being responsive to timed address selection data to provide a data transfer gating signal simultaneously to each storage unit of the corresponding column, said reset units being responsive to first timed reset signals for simultaneously controlling the data recirculation of each storage unit of the corresponding column, an exit unit corresponding to each of said rows and comprising a gate buffer amplifier adapted to store data by recirculation, each of said storage units being coupled to the exit of the associated row, said data transfer gating signals being effective to transfer to each of said exit units the contents of a chosen one of said connected storage units, said exit units being simultaneously responsive to second timed reset signals to control data recirculation in each unit.

6. A dynamic digital data storage device comprising a plurality of storage units arranged by columns and rows, each of said storage units including a storage amplifier, at least first and second gates buffered to the input of said storage amplifier, the first one of said gates having one of its inputs connected to the output of said amplifier and being adapted to receive a reset signal at its other input, a data entry unit associated with each of said rows, each of said entry units comprising a data entry amplifier, at least one gate buffered to the input of said last-recited amplifier, said last-recited gate being adapted to receive said data and a first timing function at its inputs, the output of said data entry amplifier being connected to one input of said second gate of each of said storage units in said associated row, a selection unit associated with each of said columns, each of said selection units comprising a selection amplifier, at least one gate buffered to the input of said selection amplifier, said last-recited gate being adapted to receive address selection data and a second timing function at its inputs, the output of each of said selection amplifiers being connected to another input of said second gate of each of said storage units in said associated column, and an exit unit corresponding to each of said rows, each of said exit units including an exit amplifier having a plurality of exit gates buffered to its input one for each storage unit of the associated row, each of said exit gates having one input connected to the storage amplifier output of its corresponding storage unit and its other input connected to the selection amplifier output of the column selection unit which corresponds to said last-recited storage unit, said plurality of exit gates further including a gate having one of its inputs connected to the output of said exit amplifier and being adapted to receive a third timing function on another input thereof.

7. The apparatus of claim 6 and further comprising a reset unit corresponding to each of said columns including a reset amplifier adapted to provide said reset signal at its output, at least one reset gate buffered to the input of said reset amplifier, said reset gate being connected to receive a fourth timing function at its inputs together with the address selection data coupled to the selection unit of the corresponding column.

References Cited in the file of this patent

UNITED STATES PATENTS

| | | |
|---|---|---|
| 2,994,853 | Astrahan | Aug. 1, 1961 |
| 3,047,843 | Katz | July 31, 1962 |
| 3,064,241 | Schneider | Nov. 13, 1962 |
| 3,065,304 | Dawson | Nov. 20, 1962 |